United States Patent [19]

Dernovashek et al.

[11] 3,753,476

[45] Aug. 21, 1973

[54] BRAKE DISC SUBASSEMBLY WITH SEGMENTED BERYLLIUM CORE

[75] Inventors: Joseph F. Dernovashek, Akron; Peter D. Birmingham, Suffield; Charles E. Fuchs, N. Canton, all of Ohio

[73] Assignee: The Goodyear Tire & Rubber Company, Akron, Ohio

[22] Filed: Oct. 27, 1971

[21] Appl. No.: 192,974

Related U.S. Application Data

[63] Continuation-in-part of Ser. No. 49,242, June 24, 1970, Pat. No. 3,710,210.

[52] U.S. Cl. ...... 188/73.2, 188/218 XL, 192/107 R
[51] Int. Cl. ............................................. F16d 65/12
[58] Field of Search .................. 188/218 XL, 73.2; 192/107 R

[56] References Cited
UNITED STATES PATENTS

| | | | |
|---|---|---|---|
| 3,403,759 | 10/1968 | Holcomb, Jr. | 188/218 XL |
| 3,618,729 | 11/1971 | Ely | 188/218 XL |
| 2,553,828 | 5/1951 | McCune | 188/218 XL |
| 3,237,731 | 3/1966 | DuBois | 192/107 R |
| 3,605,967 | 9/1971 | Warren et al. | 188/218 XL |

Primary Examiner—George E. A. Halvosa
Attorney—F. W. Brunner et al.

[57] ABSTRACT

Brake discs which have a pair of annular steel plates and segmented beryllium filler plates between the annular steel plates. The steel plates have sintered metallic outer faces and are riveted together on opposite sides of the beryllium plates. The beryllium filler plates extend from the center of one key slot to the center of the adjacent key slot and each of the filler plates is sloped on one or more edges. Metallic inserts are riveted to the annular steel plates. The inserts serve to transmit torque across a broad area to the beryllium filler pieces by wedging action between the sides of the inserts and the sloped portions fo the filler plates.

6 Claims, 8 Drawing Figures

INVENTORS
JOSEPH F. DERNOVSHEK
PETER D. BIRMINGHAM
CHARLES E. FUCHS
BY
Oldham & Oldham
ATTORNEYS

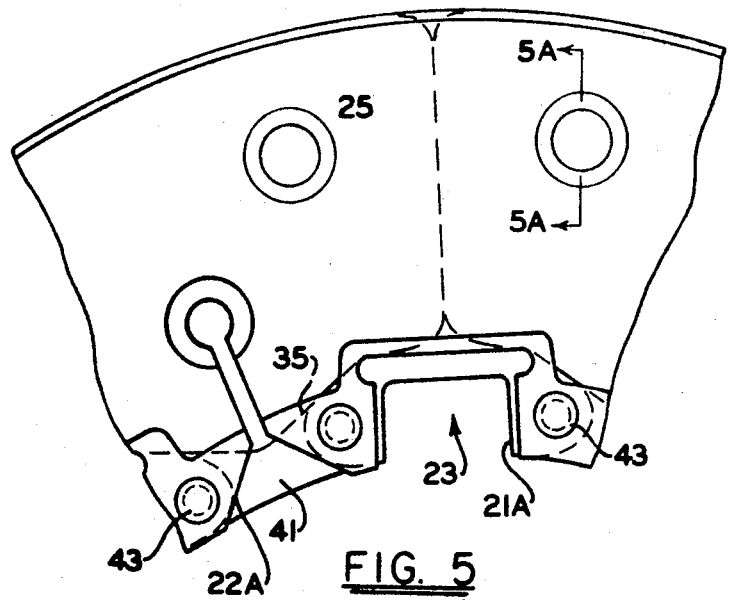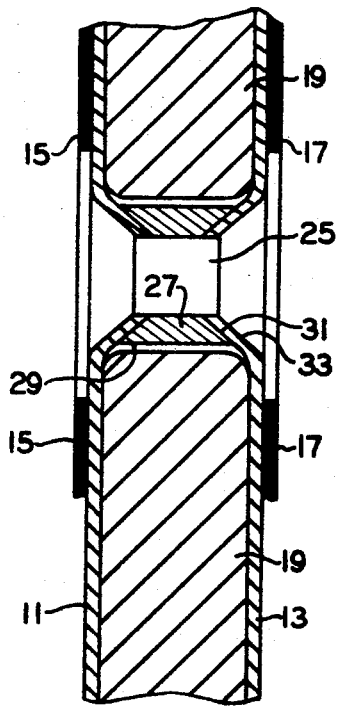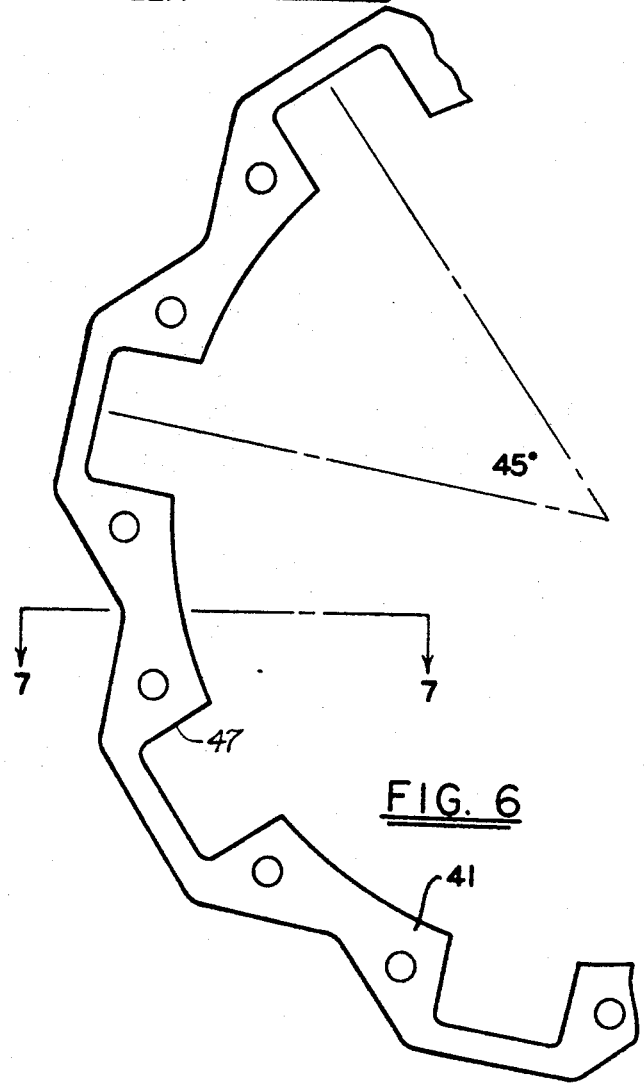

BRAKE DISC SUBASSEMBLY WITH SEGMENTED BERYLLIUM CORE

This application is a continuation-in-part of copending application Ser. No. 49,242, filed June 24, 1970, now Pat. No. 3,710,210.

The present invention relates to brake discs and more particularly to said discs which employ beryllium heat sink fillers.

The use of heat sink filler plates in brake discs is well known as is the use of beryllium plates for this purpose. However, the earlier brake discs employing beryllium filler plates have relied entirely on the steel discs to transmit the braking torque and as a result the steel discs must be relatively heavy to withstand the forces transmitted.

While beryllium possesses characteristics of high specific heat and thermal conductivity together with low density which make it suitable for use as a heat sink material, it also possesses low structural characteristics especially at higher temperatures, and as a result cannot be subjected to large thermal or structural stresses. In the brake discs of the prior art, the beryllium filler plates have been utilized solely as heat sik members and the steel plates relied upon to transmit all of the torque forces encountered during braking. This arrangement, however, requires the use of heavy steel plates increasing the weight of the brake discs.

It is the principle object of the present invention to provide a brake disc having a beryllium filler plate and steel face plates which in total is of light weight than the discs of the prior art.

It is also an object of the present invention to provide a brake disc having beryllium filler plates in which the beryllium filler plates may be reused when the steel plates have become worn.

As will become apparent from the following specification, the objectives of the present invention are accomplished by providing a disc assembly which consists of two steel plates having sintered metallic wear faces and beryllium filler plates carried between the steel plates. The invention comtemplates the use of metallic inserts to transmit a portion of the braking torque between the beryllium segments and the keys in such a manner that the segments while subjected to forces are not subjected to excessive stresses.

For a more complete understanding of the invention reference should be had to the following specification and accompanying drawings wherein there is shown a preferred embodiment in the invention.

In the drawings:

FIG. 5A is a fragmentary sectional view taken along line 5A—5A of FIG. 5;

FIG. 7 is a fragmentary sectional view taken along the line 7—7 of FIG. 6.

Figure 1:
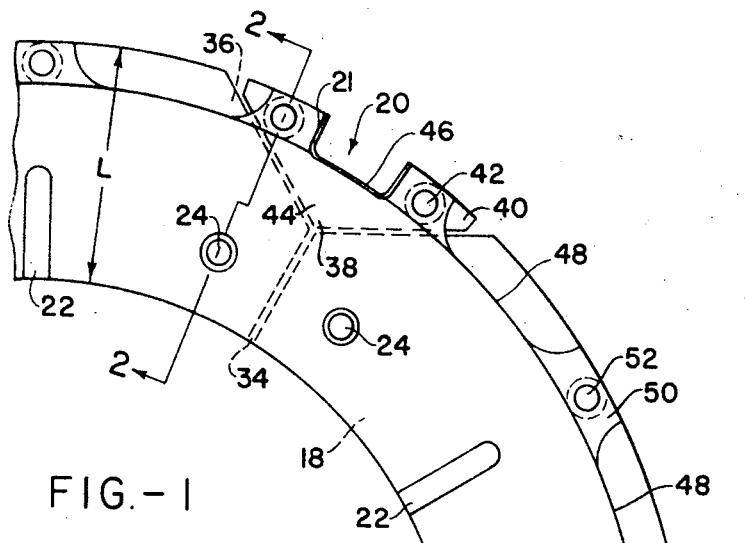
FIG. 1 is a fragmentary side elevational view of a rotating aircraft disc constructed in accordance with the present invention.
Figure 2:
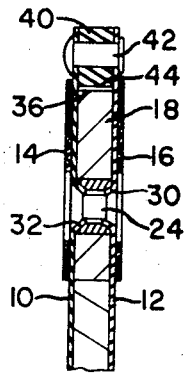
FIG. 2 is a fragmentary sectional view taken along the line 2—2 of FIG. 1.

Referring to FIGS. 1 and 2 there is shown a portion of a rotating brake disc which includes a pair of annular steel plates 10 and 12 which have sintered metallic outer faces 14 and 16, respectively. Each of the plates 10 and 12 forms a complete circle. Beryllium filler plates 18 are received between the steel plates 10 and 12 and each filler plate extends along a 60° segment of the brake disc.

Each of the annular steel plates 10 and 12 has notches 20 on its outer circumference uniformly spaced at 60° intervals along the discs. These notches or slots 20 receive keys or straight splines on the underside of the wheel rim (not shown) so that the discs rotate with the wheel. The key or splines actually engage steel inserts 40 to be more fully explained hereinafter. The discs 10 and 12 are also provided with deep U-shaped slots 22 at uniformly spaced intervals along their inner circumferences to allow for expansion of the disc without warping or distortion.

In the preferred embodiment each of the beryllium filler plates 18 extends from the radial center line of one of the slots 20 to the radial center line of the adjacent slots 20. The discs 10 and 12 and filler plates 18 are secured together by rivets 24 which pass through steel bushings 26 received in holes 28 of the filler pieces 18. The ends of the bushings 26 are cambered as indicated at 30 and the steel 10 and 12 are bent inwardly as indicated at 32 to conform to the cambered ends of the bushings 26. This arrangement of the cambered edges and the steel bushings 26 assures a uniform clamping of the steel plates 10 and 12 to the beryllium filler pieces 18 and prevents excessive concentration of forces around the edges of the holes 28 in the beryllium plates 18. Further, it allows the head of rivet 24 to remain below the rubbed surface of plates 10 and 12. There are two features of the bushings 26 that are important to the objects of the invention. First, the bushing 26 achieves a proper projected area to allow the beryllium core pieces to take torque and secondly it allows a small size rivet and head to be used so there is no projection above the rubbed surface of the outer plates. It is important that the bushing 26 have a clearance with the core piece of not more than 0.020 inches so the fit is not sloppy, but not less than 0.003 inches so that expansion of the bushing 26 will not cause a hooping effect and crack the beryllium itself. The projected area of the bushing 26 is critical to achieve the proper torque loading of the core pieces without failure. The projected area is defined herein as the outside diameter of the housing times the length thereof, with this product being in square inches. The invention comtemplates that the projected area loading must not be greater than 6,000 psi, and for the purpose of obtaining the best heat sink capability for the material should not be less than 1,000 psi.

The ends of the beryllium filler pieces have straight portions 34 which are parallel to the radial center line of the notch 20 and upper portions 36 which are inclined 60° to the radial center line of the notch 20. Thus, adjacent filler plates 18 define a V-shaped notch 38 centered with the notch 20. Steel inserts 40 are attached to the annular steel plates 10 and 12 by rivets 42. These inserts have lower edges 44 which extend at 60° to the radial center line of the notch 20 and, thus, parallel to the sloped edges 36 of the beryllium core pieces 18. The steel inserts 40 also have notches 46 on their outer surfaces to engage the keys or splines of the wheel. The notches 20 in the plates 10 and 12 are cut back somewhat as indicated by line 21 in FIG. 1 so the keys or splines only engage the notches 46 of the inserts 40. As will be seen in FIG. 1, adjacent edges 34 of the beryllium cores are separated from one another by short distances as are the adjacent edges 36 of the cores and the edges 44 of the steel inserts 40 to give some fabrication tolerance and allow the cores to somewhat float in their laminated relationship between the plates 10 and 12.

Preferably, the angled or inclined portions 36 of the filler piecs 18 and the inclined edges 44 of the inserts 40 are at angles of 50° to 70° relative to a radial, with 60° being optimum. The depth of the angles or the V-notches 38 of adjacent pieces 18 should be between 30 and 60 percent the face width of the beryllium pieces. We mean the distance indicated by line L in FIG. 1 as the face width. The cooperating inclined surfaces 36 and 44 at such critical angular relationship must comprise a minimum of 30 percent of the inclined distance. The inclined distance is defined as the full distance from the base of the V-notches 38 along the critical angle to the edge of the respective filler piece 18 and insert 40. Hence, it should be understood that the pieces 18 could take various geometric configurations as longs as sufficient cooperating relationship is achieved along the critical angle with the respective insert 40.

The annular steel plates 10 and 12 are also provided with notches 48 along their outer circumferences which serve to prevent bending of the disc assembly or uneven transfer of torque between the steel plates 10 and 12 and the beryllium core pieces 18. The projecting portions 50 of the steel plates 10 and 12 between the adjacent notches 48 carry rivets 52 which serve to further secure the plates 10 and 12 and the beryllium filler plates 18 as a laminated or stacked unit.

Figure 3:
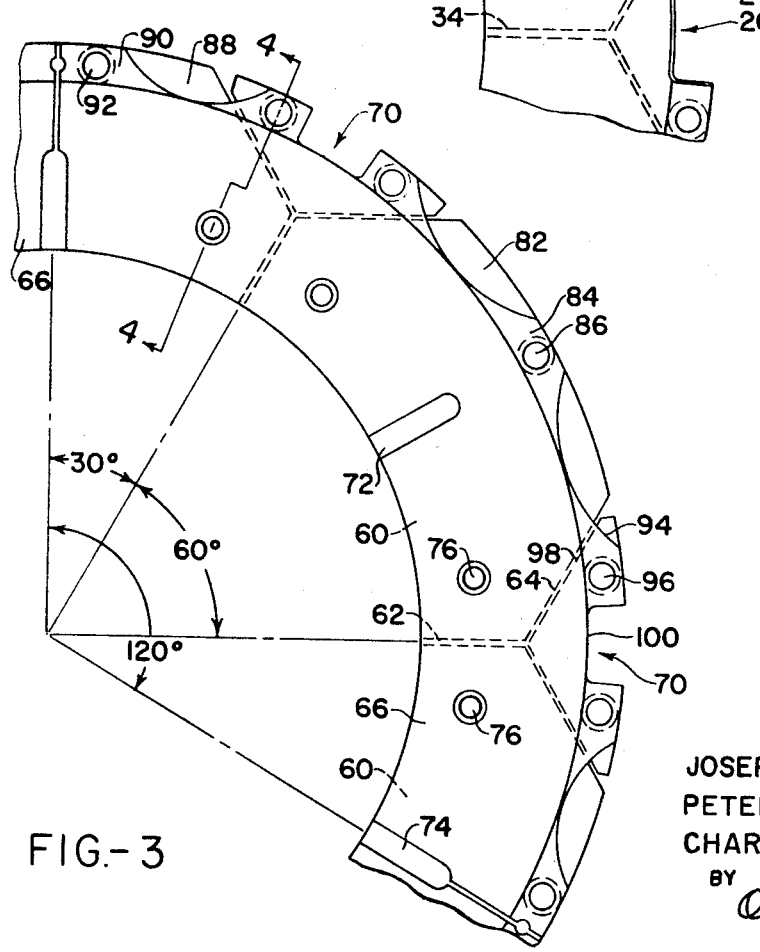
FIG. 3 is a fragmentary side elevational view of a modified rotating brake disc also constructed in accordance with the principles of the present invention.
Figure 4:
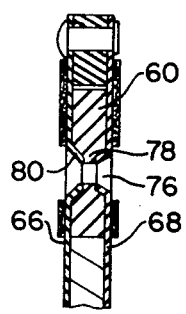
FIG. 4 is a fragmentary sectional view taken along line 4—4 of FIG. 3.
Figure 5:
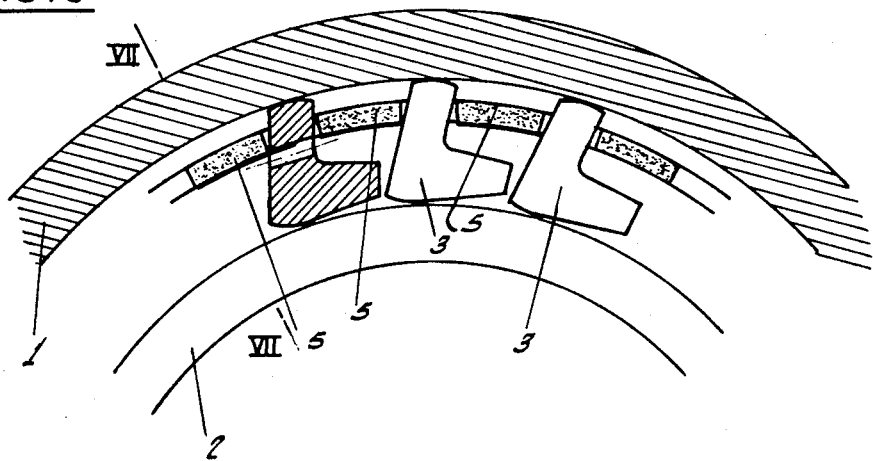
FIG. 5 is a fragmentary side elevational view of an aircraft stationary disc subassembly constructed in accordance with the present invention.

FIGS. 3 and 4 illustrate a second embodiment of the invention for a rotating brake disc. In this embodiment six beryllium filler plates 60, each in the form of a 60° segment of an annular ring and having a straight radially inner end portion 62 and an upper end portion 64 inclined at 60° from the straight end portion 62 are held between steel plates 66 and 68, each of which is in the form of three 120° segments of an annular ring. Each of the plates 66 and 68 has a pair of notches 70 on its outer circumference located 30° from the end of the plate and 60° from one another. One of the beryllium filler pieces 60 is positioned between each of the notches 70. Opposite ones of the beryllium filler pieces 60 span the ends of the adjacent steel plates 66 and 68. Each of the plates 66 and 68 is provided with a deep U-shaped notch 72 extending radially outward from the inner circumference of the plate midway between the ends thereof. The radially inward portions of the ends of the plates are also notched to provide U-shaped notches 74 between adjacent plates 66 and 68.

The steel plates 66 and 68 and the beryllium filler pieces 60 are secured to one another by rivets 76 which pass through bushings 78 in the beryllium plates 60. As in the previously described embodiment, the ends of the bushings are cambered and the plates 66 and 68 bent inwardly as indicated at 80, to correspond to the cambered edges of the bushings 78. The outer circumference of the steel plates 66 and 68 between adjacent notches 70 of the same plate are notched as shown at 82. These notches are the uniform radium and leave a portion 84 of the plate which receives rivets 86 serving to further secure the plates 66 and 68 and the beryllium core 60 as a unit. A notch 88 is also provided in the outer circumference in each of the plates 66 and 68 between the notch 70 and the end of the plate. These notches 88 are of uniform radium, but are smaller than the notches 82 to provide end portions 90 at each end of the plates 66 and 68. Rivets 92 are provided in the end portions 90 of each plate.

As in the previous embodiment, steel inserts 94 are secured by rivets 96 to the plates 66 and 68 at the notches 70 and these inserts have sloped inner edges 98 which extend parallel to the sloped edges 64 of the filler plates 60. The inserts 94 also have notches 100 aligned with the notches 70 of the steel plates 66 and 68. Preferably, the relationship between the notches 70 and 100 is the same as between the notches 20 and 46 defined above.

FIGS. 5, 5A, 6, 7 illustrate a third embodiment of the invention for use in stationary brake discs.

Referring to FIGS. 5, 5A, 6 and 7 there is shown a portion of a stationary brake disc which includes a pair of annular steel plates 11 and 13 which have sintered metallic outer faces 15 and 17, respectively. Each of the plates 11 and 13 forms a complete circle. Beryllium filler plates 19 are recieved between the steel plates 11 and 13 and each filler plate extends along a 45° segment of the brake disc.

Figure 6:
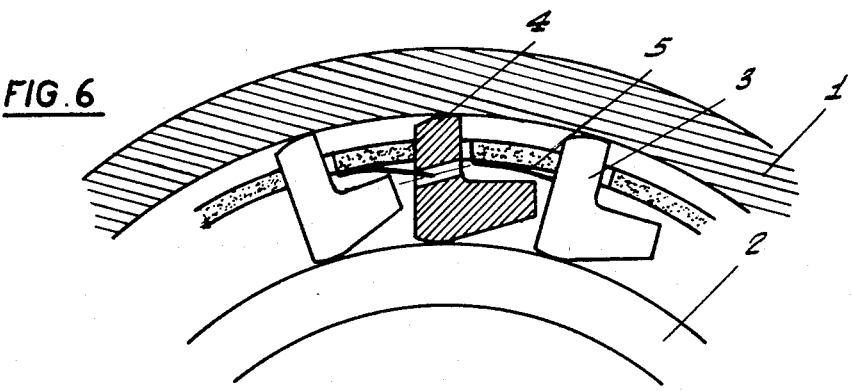
FIG. 6 is a fragmentary side elevational view of an annular metallic ring insert used to transmit a portion of braking torque to the beryllium segments used in a stationary disc subassembly constructed in accordance with the principles of the present invention.
Figure 9:
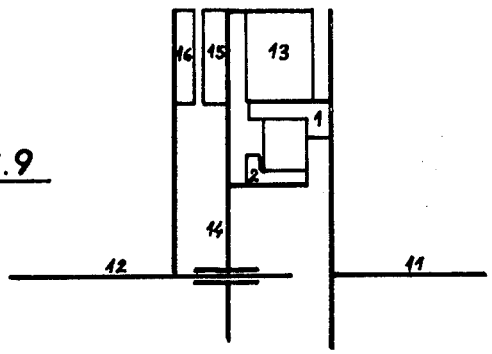

Each of the annular steel plates 11 and 13 has notches 23 on its outer circumference uniformly spaced at 45° intervals along the discs. These notches or slots 23 receive keys or straight splines on the torque tube or axle of an aircraft wheel (not shown) so that the disc remains stationary while the wheel turns. The keys or splines actually engage a steel insert 41 as shown in FIG. 6 to be more fully explained hereinafter. The discs 11 and 13 are also provided with deep keyhole shaped slots 22A at uniformly spaced intervals along their inner circumferences to allow for expansion of the disc without warping or distortion.

In this embodiment each of the beryllium filler plates 19 extends from the radial center line of one of the slots 23 to the radial center line of the adjacent slot 23. The discs 11 and 13 and filler plates 19 are secured together by rivets 25 which pass through steel bushings 27 received in holes 29 of the filler pieces 19. The ends of the bushings 27 are cambered as indicated at 31 and the steel plates 11 and 13 are bent inwardly as indicated at 33 to conform to the cambered ends of the bushings 27. This arrangement of the cambered edges and the steel bushings 27 is the same as described in the previous embodiments.

The ends of the beryllium filler pieces are parallel to the radial center line of the notch 23. The radially inward edges 35 of each filler piece is angled to have a protruding portion shaped as in inverted "V", the sides of the inverted V slope at an angle of about 67½° relative to a radial through the center of the inverted V. A steel annular ring insert 41 is attached to the annular steel plates 11 and 13 by rivets 43. The annular ring insert has notches 47 at the inside diameter to engage keys or splines of a torque tube and is scalloped on the outside diameter to receive the inverted V segments of beryllium. The notches 23 in the plates 11 and 13 are cut back somewhat as indicated by line 21A in FIG. 5 so the keys or splines only engage the notches 47 of the insert 41.

Preferably, the angled or inclined portions 35 of the filler pieces 19 and the scalloped outer edges of the insert 41 are at angles of 50° to 70° relative to a radial. The height of the angles or the inverted V protruded portion of each beryllium filler piece should be between 30 and 60 percent the face width of the beryllium pieces. The inclined distance is defined as the full distance from the base of the inverted V to the peak thereof. Hence, it should be understood that the pieces 19 could take various geometric configurations as long as sufficient cooperating relationship is achieved along the critical angle with the insert 41.

In any of the embodiments described, the torque transmitted between the beryllium filler pieces and the steel inserts is transmitted along the broad area of contact between the sloped edges of the filler plates and the correspondingly sloped edges of the steel inserts. As a result, the torque is transmitted by wedging action and is applied uniformly over a substantial area of the beryllium plate to prevent excessive stressing along a small region. The rivets 24, 25 and 76 because of the cambered insert further serve to transmit torque between the steel plate and the beryllium core.

While the angle between the steel inserts and the beryllium core pieces is illustrated as being about a 60° – 120° relationship, it should be understood that this relationship might vary between about 50° – 70°; 100° – 140°, and still meet the objects of the invention. Further, while the radial depth of the steel insert relative to the beryllium core pieces as illustrated in the rotating disc embodiments of the invention as being one-third the radial depth, to give the best heat sink/weight, torque transfer ratio, it should be understood that the radial depth could vary about 20 percent to the radially outward side and by about 50 percent to the radially inward side. Also it should be understood that the radial height of the inverted V of the beryllium pieces in the stationary disc embodiment of the invention could vary according to the above ranges of the angle between the beryllium core piece and the steel insert.

Further, it should be understood that the shape of the core pieces could vary to different geometric designs so long as the critical cambered angle relationship over a minimum area between the inserts and the core pieces is maintained.

It will be understood that while specific embodiments of the invention have been described, the invention is not so limited and changes or additions can be made thereto without departing from the essence thereof. Reference should therefore be had to the following claims in determining the true scope of the invention.

What is claimed:

1. A stationary brake disk assembly for a vehicle wheel comprising:
   a beryllium core in the form of an annular ring consisting of a plurality of beryllium core pieces, the ends of each core piece having one portion in parallel abutting face to face relation to the same portion of the adjacent core piece and a second portion inclined from the one portion whereby adjacent core pieces define a V shaped notch;
   steel plates on each side of said beryllium core, said steel plates forming annular rings;
   rivets securing said steel plates and beryllium core as a unit; and
   a continuous annular metallic ring insert secured between the steel plates on the radially inward surface thereof, said insert having inner edges arranged complementary in direct abutting face to face relation to the inclined edges of the core pieces to affect torque transfer through said edges, and notches on the radially inward edge to receive the keys of a torque tube of the vehicle axle.

2. The brake disc assembly according to claim 1 wherein said beryllium core consists of six equal size core pieces, and the steel plates are cut away around the notch on the inner edge of the steel insert.

3. The brake disc assembly according to claim 1 wherein each of said steel plates consists of a single annular ring having essentially the same inner and outer diameters as the beryllium core.

4. The brake disc assembly according to claim 1 wherein three 120° arcuate steel plates form each annular ring, a beryllium core piece spanning the gap between adjacent steel plates, and the annular rings of steel plates having essentially the same inner and outer diameters as the beryllium core.

5. The brake disc assembly accordingly to claim 1 wherein the inclined angular relation between the insert and core pieces is between 50° and 70°.

6. The brake disc assembly according to claim 1 wherein said steel plates and said core pieces are secured together by rivets passing through steel bushings in said core pieces, the ends of said bushings being cambered and said steel plates being formed in the region of said rivets to conform to the camber of said bushings, said bushings defining a projected area such that the torque loading into the core pieces falls between 1,000 psi to 6,000 psi.

* * * * *

PO-1050
(5/69)

UNITED STATES PATENT OFFICE
CERTIFICATE OF CORRECTION

Patent No. 3,753,476  Dated August 21, 1973

Inventor(s) J F Dernovshek, P D Birmingham, C E Fuchs

It is certified that error appears in the above-identified patent and that said Letters Patent are hereby corrected as shown below:

In the abstract, line 12, "fo" should read --of--.

Column 1, line 23, "sik" should read --sink--;

line 50, after embodiment "in" should read --of--.

Column 2, line 32, after steel insert --plates--;

line 56, "housing" should read --bushing--.

Column 3, line 21 "and" should read --to--;

line 31, "longs" should read --long--.

Column 4, line 61, "edges" should read --edge--.

Signed and sealed this 26th day of March 1974.

(SEAL)
Attest:

EDWARD M. FLETCHER, JR.
Attesting Officer

C. MARSHALL DANN
Commissioner of Patents